(12) United States Patent
Moser et al.

(10) Patent No.: US 7,548,920 B2
(45) Date of Patent: Jun. 16, 2009

(54) SYSTEMS AND METHODS OF ACCESSING AND UPDATING RECORDED DATA VIA AN INTER-OBJECT PROXY

(75) Inventors: Thomas Moser, Wiesloch (DE); Peter Sieber, Wiesloch (DE); Thomas Schira, Wiesloch (DE)

(73) Assignee: SAP AG, Walldorf (DE)

( * ) Notice: Subject to any disclaimer, the term of this patent is extended or adjusted under 35 U.S.C. 154(b) by 286 days.

(21) Appl. No.: 11/322,712

(22) Filed: Dec. 30, 2005

(65) Prior Publication Data

US 2007/0156690 A1 Jul. 5, 2007

(51) Int. Cl.
*G06F 7/00* (2006.01)
*G06F 17/00* (2006.01)

(52) U.S. Cl. ............ 707/9; 707/1; 707/10; 707/100; 707/101; 707/102

(58) Field of Classification Search ............ 707/9, 707/1, 10, 100–104.1
See application file for complete search history.

(56) References Cited

U.S. PATENT DOCUMENTS

| | | | |
|---|---|---|---|
| 5,319,780 A | 6/1994 | Catino et al. | |
| 5,341,491 A | 8/1994 | Ramanujan | |
| 5,414,839 A | 5/1995 | Joshi | |
| 5,933,825 A * | 8/1999 | McClaughry et al. | 707/8 |
| 6,012,085 A * | 1/2000 | Yohe et al. | 709/217 |
| 6,490,654 B2 | 12/2002 | Wickeraad et al. | |
| 6,529,905 B1 | 3/2003 | Bray et al. | |
| 6,865,549 B1 * | 3/2005 | Connor | 705/51 |
| 6,944,626 B2 * | 9/2005 | Cameron et al. | 707/103 R |
| 2001/0051949 A1 * | 12/2001 | Carey et al. | 707/103 R |
| 2002/0091702 A1 * | 7/2002 | Mullins | 707/100 |
| 2003/0097369 A1 * | 5/2003 | McKnight et al. | 707/102 |
| 2003/0115447 A1 * | 6/2003 | Pham et al. | 713/153 |
| 2004/0019892 A1 | 1/2004 | E. et al. | |
| 2004/0143745 A1 * | 7/2004 | Margolus et al. | 713/176 |
| 2004/0255048 A1 * | 12/2004 | Lev Ran et al. | 709/249 |
| 2005/0071355 A1 * | 3/2005 | Cameron et al. | 707/100 |
| 2005/0149539 A1 * | 7/2005 | Cameron et al. | 707/100 |
| 2006/0136464 A1 * | 6/2006 | Rossmann | 707/102 |

(Continued)

OTHER PUBLICATIONS

Type-Based Hot Swapping of Running Modules (extanded abstract)—Dominic Duggan—International Conference on Functional Programming—Proceedings of the sixth ACM SIGPLAN International Conference on Functional Programming—ACM—2001 (pp. 62-73).*

(Continued)

*Primary Examiner*—John E Breene
*Assistant Examiner*—Anh Ly
(74) *Attorney, Agent, or Firm*—Schwegman, Lundberg & Woessner, P.A.

(57) ABSTRACT

Some embodiments provide a system including a database, two or more data access objects, and a proxy object. In some such embodiments, each data access object has exclusive access privileges to a subset of data within the database. Further each object includes one or more of a read method that provides access to data and a write method that causes data to be stored. In such embodiments, the proxy object accesses data via data access object methods and includes a valuate method, the execution of which causes data to be passed from a data access object to the proxy object.

16 Claims, 6 Drawing Sheets

U.S. PATENT DOCUMENTS

2007/0156688 A1    7/2007    Moser et al.

OTHER PUBLICATIONS

"Stateful distributed Interposition" John Reumann & Kang G. Shin—ACM Transactions on Computer Systems (TOCS), vol. 22, Issue 1 (ACM Feb. 2004) (pp. 1-48).*

Inter-Cluster Service Lookup Based on Jini - Wen-Hsien Tseng & Hising Mei—AINA—Proceedings of the 17th International Conference on Advanced Information Networking and Applications—ACM 2003 (p. 84).*

"A Yet Another Java.lang.class"—Shigeru Chiba and Michiaki Tatsubori—ACM 2002 (pp. 1-9).*

"Multimedia Explorer: Image database, Image Proxy_server and Search Engine" - Thomas Frankenwitsch & Ulrich Prokosch - University of Muenster, Germany Proc. AMIA Symp, 1999 - amia.org (pp. 1-5).*

"Concurrent Object-Oriented Languages and the Inheritance Anomaly" - Dennis G. Kafuse and R. Greg Lavender, - Paraller Computers: Theory and Practice - 1996 (pp. 1-43).*

"U.S. Appl. No. 11/323,503, Response filed Sep. 16, 2008 to Final Office Action mailed Jun. 16, 2008", 11 pgs.

"U.S. Appl. No. 11/323,503, Response filed Mar. 27, 2008 to Non-Final Office Action mailed Dec. 31, 2007", 11 pgs.

"U.S. Appl. No. 11/323,503, Final Office Action mailed Jun. 16, 2008", 22 pgs.

"U.S. Appl. No. 11/323,503 Non-Final Office Action Mailed On Nov. 26, 2008", OARN, 23 Pgs.

* cited by examiner

SYSTEMS AND METHODS OF ACCESSING AND UPDATING RECORDED DATA VIA AN INTER-OBJECT PROXY

BACKGROUND INFORMATION

In some systems, there are derived data values needed by several processes. Each time a derived data value is needed by a process, data values used in deriving the data value are retrieved from a data store, such as a database or other data object, and the derived data value is calculated. This consumes network, data store, and processing bandwidth each time the derived data value is needed.

A common way to reduce the network, data store, and processing bandwidth costs associated with derived data values is to calculate the data value once and store the derived value. However, this can create other problems. One such problem includes the need to update a stored derived data value when its underlying data changes. Another problem is when a stored derived value is calculated and not used before the underlying data is modified again. The result here is a use of resources to calculate a derived value that is never used.

A further problem develops when there are stored derived data values dependent on other derived data values. In such instances, the order in which stored derived data values are calculated can make a difference in the derived data values.

DETAILED DESCRIPTION

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, such functions correspond to modules, which are software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

Figure 1:
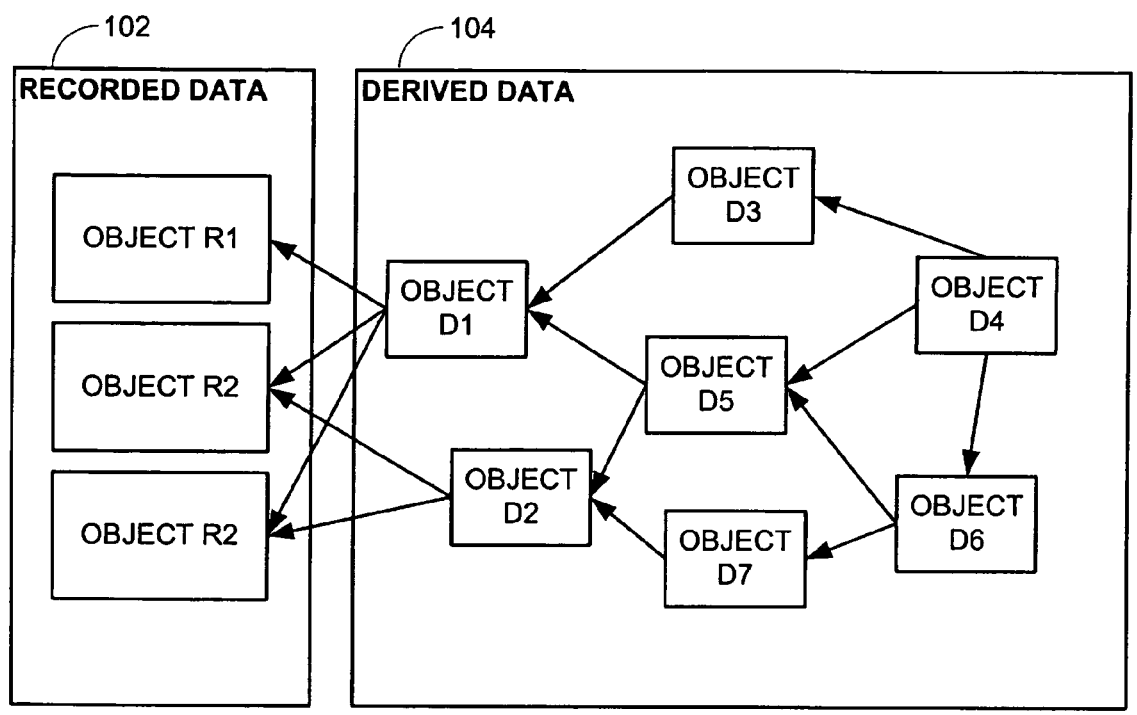
FIG. 1 is a block diagram of recorded data objects and derived data objects according to an example embodiment.

FIG. 1 is a block diagram of recorded data objects and derived data objects in a system 100 according to an example embodiment. The system 100 includes recorded data objects 102 and derived data objects 104.

An object, such as recorded data objects 102 and derived data objects 104, in some embodiments, include data and one or more methods to process, create, read, update, and delete the data. In some embodiments, the data is stored with the object. In other embodiments, the data is stored by objects in a data store, such as a database, file, memory location, or other suitable data store. An object can have no data or one or more data items. When referring to the value(s) of an object, the terms value, values, and value(s) are used interchangeably to all refer to one or more data item values a certain object may have, unless stated otherwise.

A recorded data object 102 is an object that has a raw data item that is not a calculated value. For example, raw data item examples include an hourly wage and a number of hours worked. The value(s) underlying recorded data object can be manipulated by clients. A derived data object 104 is a data object that has a calculated data value. For example, a calculated data value includes an employee's pay for a week derived from the raw data items hourly wage multiplied by the number of hours worked. The derived data object 104 would store the product of those two values. Thus, converse to recorded data objects 102, the value(s) underlying derived data objects 104 cannot be directly manipulated by clients.

In describing recorded data objects 102 and derived data objects 104, the terms "dependent object," "predecessors" and "successors" will be used. The term dependent object is a derived data object the value(s) of which depend on the value (s) of one or more other objects. Further, for a given dependent object, all the objects which the given dependent object is dependent upon are called its "predecessors." In turn, all object which depend on a given recorded data object 102 or a derived data object 104 are the given object's "successors."

In the present embodiment, the recorded data objects 102 include objects R1, R2, and R3. The derived data objects 104 include objects D1, D2, D3, D4, D5, D5, and D7. In the illustration of FIG. 1, the arrows from a derived data object to another derived data object 104 or recorded data object 102 identify the predecessor object(s) from which a derived data object 104 is calculated. For example, the value of object D4 is calculated from the value(s) of its predecessor objects D3, D5, and D6. Further, the value(s) of object D3 are derived from the value(s) of its predecessor object D1 whose value is derived from the value(s) of predecessor recorded objects R1, R2, and R3. Thus, system 100 includes derived data objects 104, such as objects D3, D4, D5, D6, and D7, the values of which are derived from values of other derived data objects 104.

In such instances, a derived data object 104, such as object D4, that calculates it value(s) based at least in part on a predecessor derived data object 104 value, such as object D5, must not calculate its value until the predecessor data object calculates its value(s). Otherwise, if a successor derived data object 104 calculates its derived value(s) before the predecessor derived data object 104, the successor derived data object 104 value(s) will quickly become incorrect.

The present subject matter provides systems, methods, and software to ensure derived data objects 104 calculate their value(s) in a predecessor to successor manner. Further, whenever a client is asking any of the derived data objects for their value, the client sees them in the correct state according to their specification. Thus, in a public view, these objects are always synchronous with the objects they depend on. In some embodiments, when a data object is updated, a given derived data object 104 only updates its value when first requested after the predecessor data object update. A second request for the given derived data object 104 data will not result in the derived data object 104 does not recalculate its value unless one or more predecessor objects from which the given derived data object 104 depends, directly or indirectly, has been modified. Thus, in such embodiments, the derived data object 104 values are not calculated unless requested. Stated differently, changes to the recorded data objects 102 does not result in automatic derived data object 104 synchronization of all dependent objects.

Figure 2:
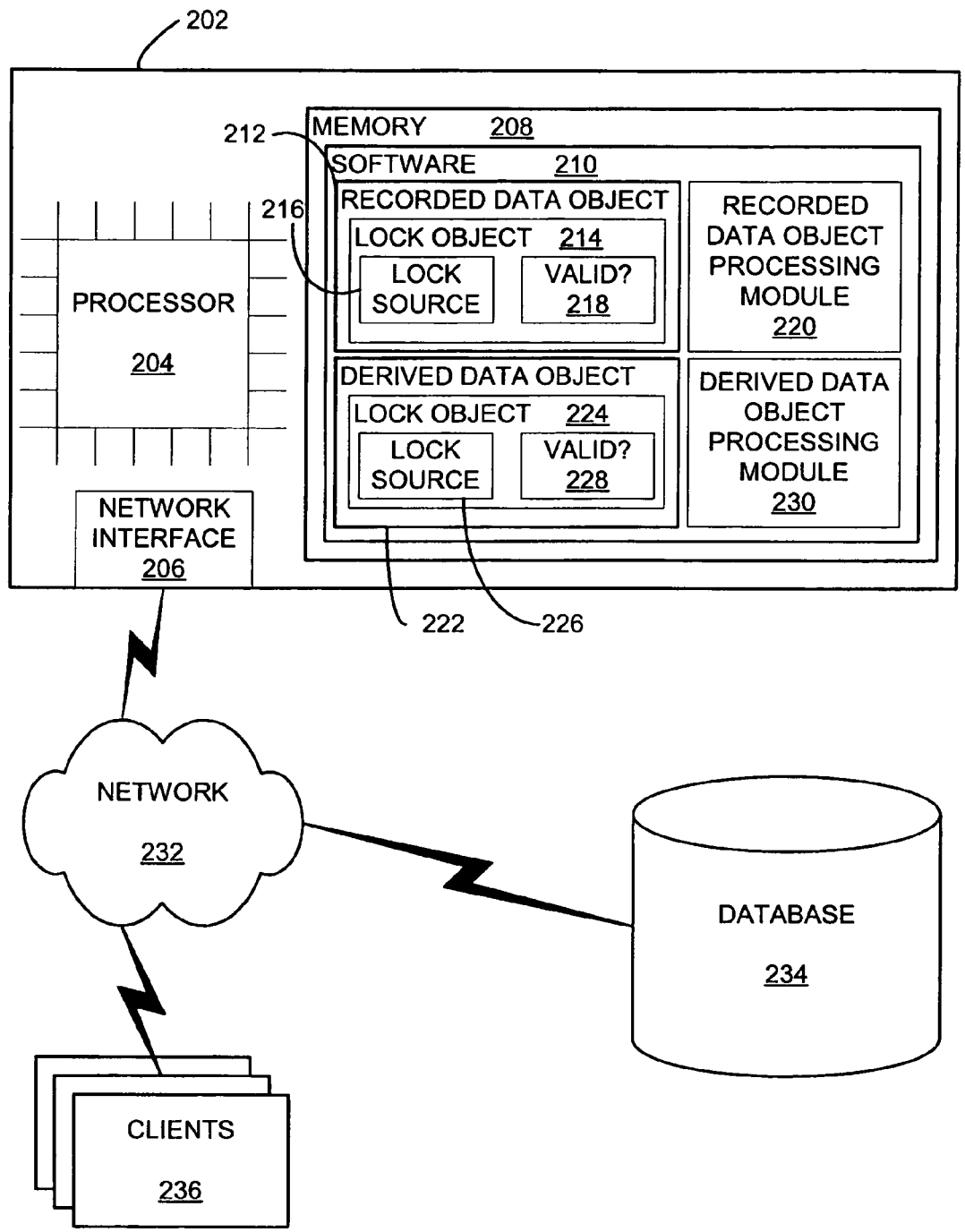
FIG. 2 is a schematic diagram of a system according to an example embodiment.

FIG. 2 is a schematic diagram of a system 200 according to an example embodiment. In some embodiments, the system 200 includes a computer 201, a database 234, and clients 236.

In some embodiments, the computer 202 is a server. In one embodiment, multiple such computers 202 are utilized in a distributed network to implement multiple components in a transaction-based environment. An object oriented architecture can be used to implement such functions and communicate between the multiple computer and components. One example computer 202 can include a processor 204, memory 208, and a network interface 206, such as a wired or wireless network card to communicate on the network 232.

In some embodiments, the memory 208 can include a volatile memory 208 and non-volatile memory 208. Computer 710 may include—or have access to a computing environment that includes—a variety of computer-readable media, such as volatile memory and non-volatile memory, removable storage, and non-removable storage. The memory 208 can include random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions and data.

Computer 202 can include or have access to a computing environment that includes input, output, and one or more communication connections, such as network interface 206. The computer can operate in a networked environment, such as on network 232 using a communication connection to connect to one or more remote computers, such as the database 234 and clients 236. In some embodiments, the communication connection to the database 234 includes a database connectivity module, such as an object or Java database connectivity (ODBC/JDBC) interface. The clients can include a personal computer (PC), server, router, network PC, a peer device or other common network node, or the like. The network 232 can include a Local Area Network (LAN), a Wide Area Network (WAN), a global network, the Internet, or other networks.

Machine-readable instructions stored on a machine-readable medium, such as memory 208, are executable by the processor 204. Further examples of a machine-readable medium include a hard drive, CD-ROM, and RAM. The term "computer readable medium" is also used to represent carrier waves on which instructions can be transmitted. For example, a computer program capable of providing a generic technique to perform access control check for data access and/or for doing an operation on one of the servers in a component object model (COM) based system according to the teachings of the present invention may be included on a CD-ROM and loaded from the CD-ROM to a hard drive. The machine-readable instructions allow computer 202 to provide generic access controls in a COM based, or other protocol based, network system having multiple users and servers.

In some embodiments, the memory 208 includes software 210 stored thereon. In some embodiments, the software includes one or more recorded data objects 212, one or more derived data objects 222, one or more recorded data object processing modules 220, and one or more derived data object processing modules 230.

In some embodiments, the recorded data object processing module 220 is included as a part of at least one recorded data object 212 and the derived data object processing module 230 is included as a part of at least one derived data object 222. In other embodiments, such as a system 200 embodiment including a data object architecture that prevents data object from communicating directly with each other, the recorded data object 212 and the derived data object processing module 230 are proxy objects.

In some embodiments, each recorded data object 212 includes a lock object 214. A lock object includes at least a lock source 216 and a validity indicator 218. A lock source identifies an originating source of a lock on the recorded data object 212. The validity indicator 218 indicates if the lock on the recorded data object is valid. In some embodiments, a recorded data object 212 includes more than one lock object 214. In such embodiments, each lock object 214 identifies a unique lock source 216 when more than one lock object 214 is valid. More detail regarding the lock object 214 is provided below.

In some embodiments, each derived data object 222 includes a lock object 224. A lock object includes at least a lock source 226 and a validity indicator 228. A lock source identifies an originating source of a lock on the derived data object 222. The validity indicator 228 indicates if the lock on the recorded data object is valid. In some embodiments, a derived data object 222 includes more than one lock object 224. In such embodiments, each lock object 224 identifies a unique lock source 226 when more than one lock object 224 is valid. More detail regarding the lock object 224 is provided below.

A lock object 214, 224 is validated if a successor derived data value is synchronized based on the current value of the recorded data object 212 or derived data object 222. However, the lock source identifies the data object furthest from the object 212, 222 with a valid lock that is synchronized with the current value of the object 212, 222.

For example, referring back to FIG. 1 and to FIG. 2 simultaneously, if recorded data object 102 R1 has a valid lock object 214, the lock source 216 can identify any one of successor derived data objects 104 D1, D3, D4, D5, or D6, depending on which derived data object 104 node is furthest derived from R1 and is synchronized. More specifically, if all of the derived data objects 104 are synchronized, the lock source 216 will identify D4 because it is the furthest synchronized successor object. Similarly, if only D1 is synchronized, the lock source 216 will identify D1.

The derived data objects 104 are similar. If a derived data object 222 lock object 224 validity indicator 228 is valid, the lock source 226 identifies a holder of the lock. The holder of the lock can be the derived data object itself. For example, the example above where D1 is the only object synchronized with the current value of R1, the lock source 222 of D1 identifies D1. The same holds true for the example regarding D4 above. In that example, the lock source 222 of D4 identifies D4. However, the lock object 214, 224 of all of D4's predecessor objects is a copy of the D4 lock object 224.

In operation, if a request to update the recorded data object 212 is received from a client 236, the recorded data object processing module 220 reads the validity indicator 218 to determine if the lock is valid. If the lock is not valid, there are not any synchronized successor derived data objects 222 and the update to the recorded data object 212 can occur.

If a request to update the recorded data object is received from a client 236 and the lock object 214 validity indicator 218 is true, the lock object 214 must first be invalidated. To invalidate a lock object 214, the recorded data object processing module 220 coordinates with the derived data object processing module 230 to invalidate the recorded data object 212 lock object 214 and the lock objects 224 of all synchronized successor derived data objects 222.

In some embodiments, the coordination of the recorded data object processing module 220 and the derived data object processing module 230 begins with a request to the derived data object 222 identified in the recorded data object 212 lock object 214 lock source 216. The request tells the derived data object 222 to invalidate itself and all predecessor objects in the path between itself and the recorded data object 212 requesting the invalidation. The invalidation cascades down from the lock holder to the recorded data object 212 that requested the invalidation. After the recorded data object 212 is invalidated, the recorded data object 212 can be updated. In some embodiments, the lock source 216 value is null to identify that no other objects are synchronized with the recorded data object 212. In other embodiments, the lock source 216 identifies the recorded data object 212 itself. At this point, the recorded data object 212 successor derived data objects 222 are invalid and remain invalid until a request for their value is received.

When a request for a derived data object 222 value is received and the lock object 224 validity indicator 228 is valid, the derived data object provides its value to the requestor. However, if the validity indicator is invalid, the derived data object 222 synchronizes itself on demand with its predecessors and validates itself.

To synchronize itself, the derived data object 222 requests values from it predecessor object(s) needed to calculate the derived value of the derived data object 222. The request to predecessor objects from the derived data object requests that the predecessor objects lock themselves and mark their lock as the derived data object 222. If the predecessor object lock object is not valid, the predecessor object synchronizes itself in the same manner. These synchronization request cascade up to one or more recorded data objects 212 until a synchronization request is fulfilled and the requested object values cascade back to the derived data object 222. Each predecessor object when providing its value to a successor object locks itself by validating its lock object 214, 224 validity indicator 218, 228 and identifying the derived data object 222 originally requesting synchronizing data. In the event a given derived data object 222 receives more than one request to synchronize itself in the same chain of synchronization requests, the derived data object synchronizes itself only in response to the first request and provides it value in response to subsequent requests.

Figure 3:
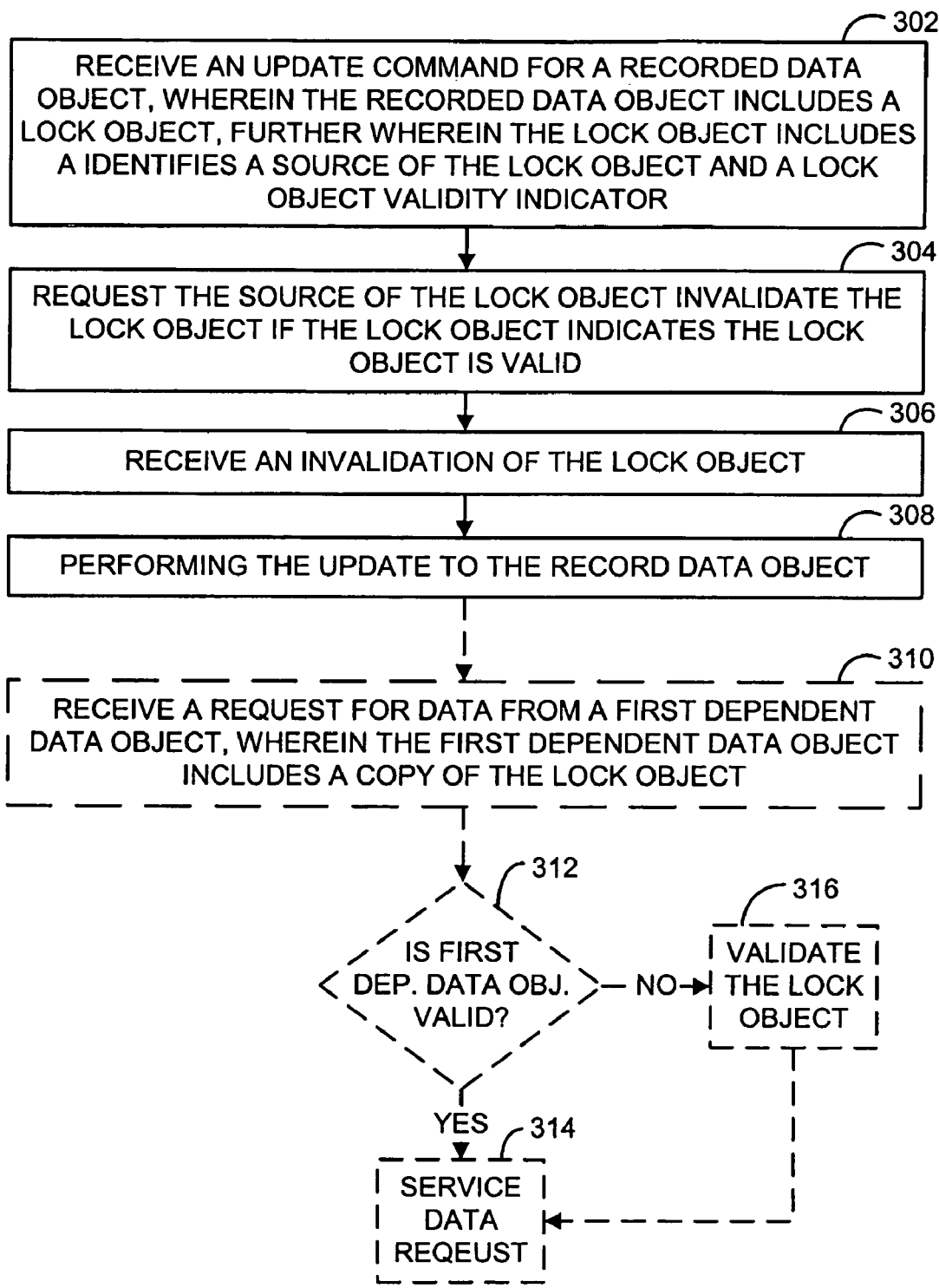
FIG. 3 is a block flow diagram of a method according to an example embodiment.

FIG. 3 is a block flow diagram of a method 300 according to an example embodiment. The example method 300 includes receiving an update command for a recorded data object, wherein the recorded data object includes a lock object, further wherein the lock object includes an identifier of a source of the lock object and a lock object validity indicator 302. The example method 300 further includes requesting the source of the lock object invalidate the lock object if the lock object indicates the lock object is valid 304, receiving an invalidation of the lock object 306, and performing the update to the record data object 308. In some embodiments, a recorded data object includes two or more lock objects, each lock object originating from a unique source.

Some embodiments of the method 300 further include receiving a request for data from a first dependent data object 310, wherein the first dependent data object includes a copy of the lock object, and determining if the first dependent data object is valid 312. If the first dependent data object lock object is valid, the method includes servicing the data request 314. If the first dependent data object lock object is not valid, the method includes validating the lock object 316 and then servicing the data request 314.

Figure 4:
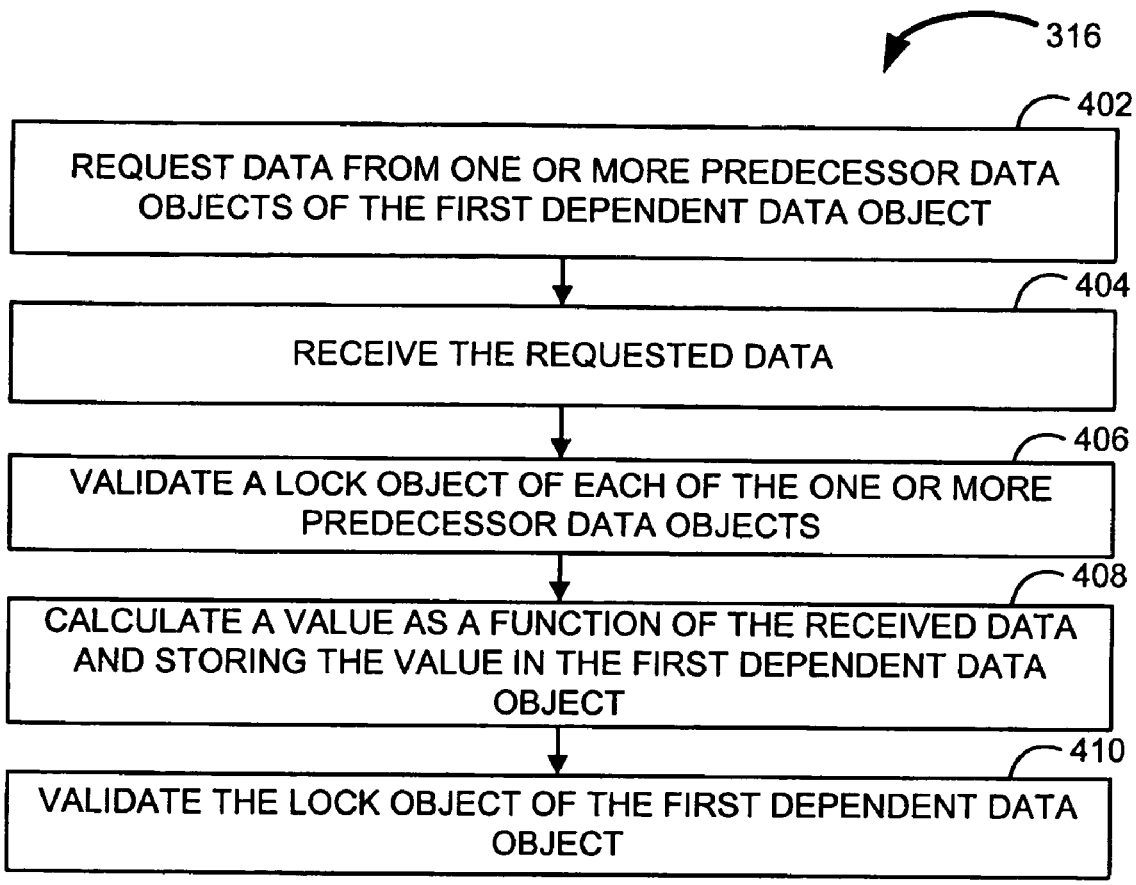
FIG. 4 is a block flow diagram of a method according to an example embodiment.

FIG. 4 is a block flow diagram of a method 316 according to an example embodiment. The method 316 provides further detail regarding validating the lock object 316. In some embodiments, validating the lock object 316 includes requesting data from one or more predecessor data objects of the first dependent data object 402 and receiving the requested data 404. This embodiment further includes validating a lock object of each of the one or more predecessor data objects 406, calculating a value as a function of the received data and storing the value in the first dependent data object 408, and validating the lock object of the first dependent data object.

Proxy Object Embodiments

Figure 5:
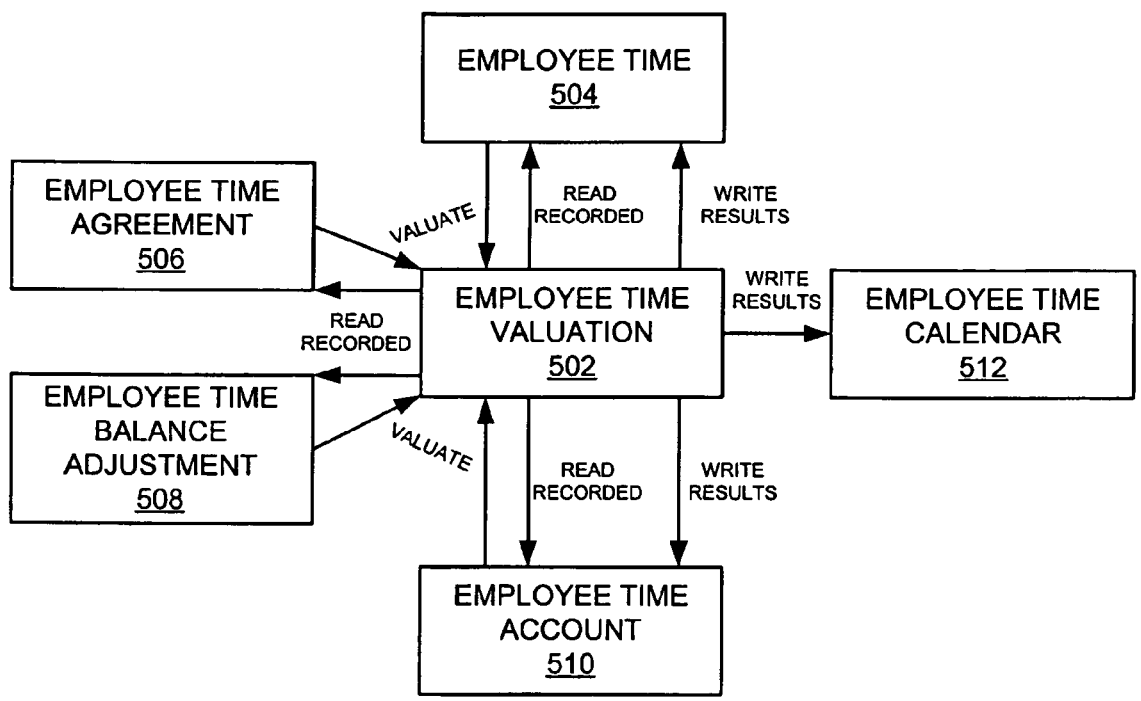
FIG. 5 is a block diagram of objects according to an example embodiment.

Various architectures provide various object types with varying privileges. For example, in some embodiments, objects one the same level cannot access each other. However, if a first object containing derived data that is calculated as a function of data from a second object on the same level, such an architecture can be a roadblock. In such embodiments, an object on a higher level that can access the first and second objects on the lower level can be used as a proxy object. FIG. 5 illustrates an example of data objects employee time 504, employee time agreement 506, employee time balance adjustment 508, employee time account 510, and employee time calendar 512 that are functionally interconnected via a proxy object employee time valuation 502.

FIG. 5 is a block diagram of objects according to an example embodiment. This embodiment illustrates a time valuation process 500. However, the concepts illustrated in FIG. 5 and described herein are equally applicable to other processes.

In this embodiment, the central business object which manages the time valuation process 500 is employee time valuation 502. Employee time valuation 502 is notified via business object valuate methods of any change of recorded data stored in business objects employee time 504, employee time agreement 506, employee time balance adjustment 508, employee time account 510. A notification to employee time valuation 502 of such a recorded data change triggers the necessary parts of the time evaluation of employee time valuation 502 business logic which is responsible for putting the obtained evaluation results into the corresponding business objects via the write results method of appropriate other business objects such as employee time 50, employee time account 510, and employee time calendar 512. In other words, the employee time valuation 502 business object handles the calculating of derived data and causes the derived data to be stored in the appropriate location. The employee time valuation 502 business object can obtain data not already received via valuate method notification via read recorded data methods of business objects including recorded data. The employee time valuation business object handles the lock objects of the recorded data objects and the derived data objects.

Note that in this embodiment, and others including those described above, a recorded data object can also be a derived data object. As mentioned above, an object can include more than one data item. Thus, business objects employee time 504 and employee time account 510 of the present embodiment include both recorded and derived data. In such instances, more than one lock object, as described above with regard to FIG. 2, are associated with the data of the employee time 504 and employee time account 510 business objects. More specifically, at least one recorded data lock object and at least one derived data lock object are associated with data included in these business objects.

In some embodiments, when the method "valuate" is triggered, a service provider within the employee valuation 502 business object handles the synchronization of the valuation results to derived data objects such as employee time 504, employee time account 510, and employee time calendar 512.

In some embodiments, the calculation of derived data is performed within Advanced Business Application Programming ("ABAP") runtime objects called valuation units. The valuation units define a model of relationships between recorded data objects and derived data objects. In some embodiments, this model is similar to the model illustrated in FIG. 1. This model can be called a "valuation net." The generic classes of the valuation net which are not specific for a particular step of the valuation define a valuation framework, which is based on the "calculate on demand" approach to derived data objects as described above. Hence, each valuation unit has a GetResults method which is used to obtain valuation results of valuation units corresponding to the current status of the recorded data. In order to perform the synchronization, a service provider of the employee time valuation 502 business object calls a factory class, which has knowledge of the valuation net and of all valuation units. This factory class can control which valuation units have to be asked for their results so that eventually the service provider can communicate, via local proxy calls, all necessary results to the business object storing the results.

In order to calculate the results, the valuation units of some embodiments need data from other business objects, in particular recorded data. The access of this data is managed by data read access classes which can be called by the valuation units and retrieve the required data via local proxy calls to the respective business objects.

Figure 6:
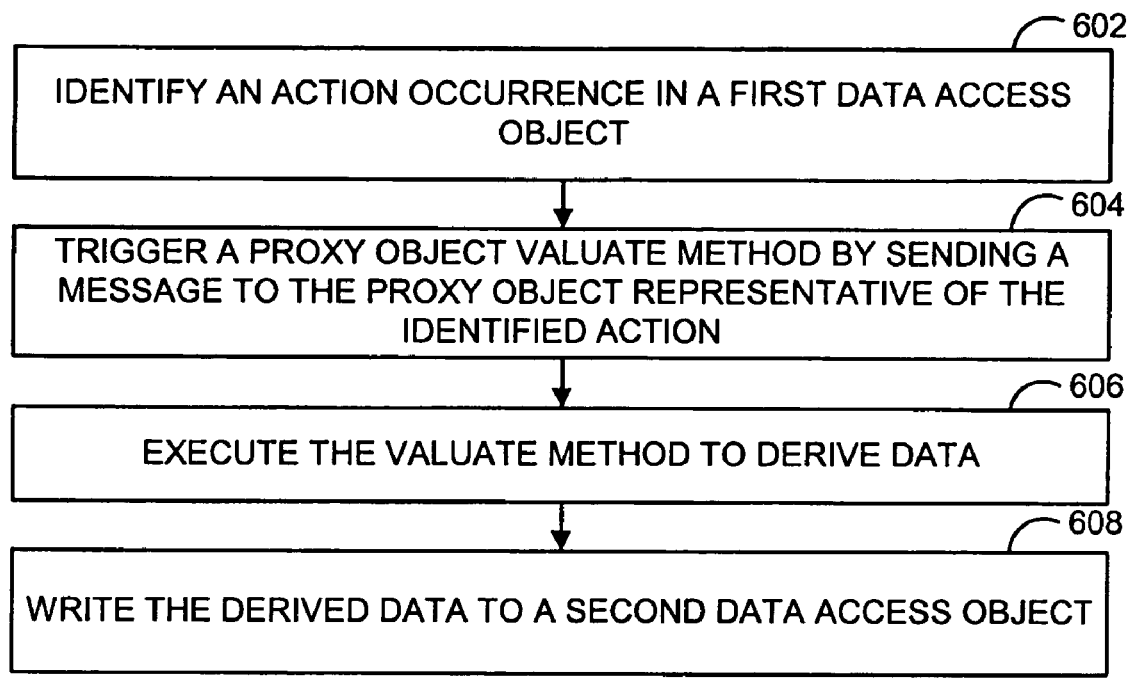
FIG. 6 is a block flow diagram of a method according to an example embodiment.

FIG. 6 is a block flow diagram of a method 600 according to an example embodiment. In some embodiments, the example method 600 includes identifying an action occurrence in a first data access object 602 and triggering a proxy object valuate method by sending a message to the proxy object representative of the identified action 604. This embodiment further includes executing the valuate method to derive data 606 and writing the derived data to a second data access object 608.

The identified action in a first data access object 602 can include one or more of a create, read, update, and delete action. In some embodiments, writing the derived data to the second data access object 608 includes the proxy object calling a write method of the second data access object. Triggering the proxy object valuate method by sending a message to the proxy object 604 can include the first data access object sending data affected by the action to the proxy object valuate method. Executing the valuate method to derive data 606 can include deriving the data as a function of the data and action representation included in the message to the proxy object.

In some embodiments of the example method 600, identifying the action occurrence in the first data access object 602 includes the first data access object receiving an action method call, performing the action method, and sending the message to the proxy object representative of the identified action if the action was performed successfully. In yet further embodiments, writing the derived data to the second data access object 608 causes another action occurrence to be identified, wherein the second data object is the same data object as the first data object.

It is emphasized that the Abstract is provided to comply with 37 C.F.R. § 1.72(b) requiring an Abstract that will allow the reader to quickly ascertain the nature and gist of the technical disclosure. It is submitted with the understanding that it will not be used to interpret or limit the scope or meaning of the claims.

In the foregoing Detailed Description, various features are grouped together in a single embodiment to streamline the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

It will be readily understood to those skilled in the art that various other changes in the details, material, and arrangements of the parts and method stages which have been described and illustrated in order to explain the nature of this invention may be made without departing from the principles and scope of the invention as expressed in the subjoined claims.

What is claimed is:

1. A system comprising:
    a processor;
    a storage device;
    a database held in the storage device;
    two or more data access objects stored in a memory and operable on the processor, wherein one or more data access objects comprise:
    exclusive access privileges to a subset of data within the database, and one or more of a read method that provides access to data and a write method that causes data to be stored;
    a proxy object stored in the memory and operable on the processor to access data via data access object methods, and
    the proxy object includes a valuate method, the execution of which occurs upon a data access object action in regard to the first data access object and causes data to be passed from a second data access object to the proxy object, wherein the proxy object processes the second data access object data to derive a data result and store the derived data result in the first data access object via a write method of the first data access object; and wherein:

at least one data object under control of one of the data access objects is a derived data object as a function of one or more other data objects, the derived data object including a lock object including lock source data and a validity indicator, and the proxy object is operable to update the validity indicator upon an update to a data object from which the derived data object is derived.

2. The system of claim 1, wherein the exclusive access privileges of a data access object include one or more of create, read, update, and delete privileges.

3. The system of claim 1, wherein the data access object action includes one or more of a create, read, update, or delete action.

4. The system of claim 1, wherein the database is a database connectivity module that provides database data access methods to the data access objects.

5. The system of claim 1, wherein the subset of data that a data access object has exclusive access privileges to is one or more tables within the database.

6. A method comprising:

identifying a first action occurrence in a first data access object, the first action occurrence causing a modification to a validity indicator of at least one data item of the first data access object, the first data access object having exclusive access to the at least one data item in storage;

calling, by the first data access object, a proxy object valuate method by sending a message to the proxy object, wherein the message includes a representation of the first identified action and data affected by the first identified action;

executing the proxy object valuate method to derive data; and writing the derived data to a second data access object, the second data access object having exclusive access to the derived data in storage.

7. The method of claim 6, wherein the first identified action includes one or more of a create, read, update, and delete action.

8. The method of claim 6, wherein writing the derived data to the second data access object includes the proxy object calling a write method of the second data access object.

9. The method of claim 6, wherein the first and second data access objects are the same data access object.

10. The method of claim 6, wherein executing the valuate method to derive data includes deriving the data as a function of the data and representation of the first identified action included in the message to the proxy object.

11. The method of claim 6, wherein identifying the first action occurrence in the first data access object includes the first data access object:

receiving an action method call of the fist identified action;

performing the first identified action method; and sending the message to the proxy object representative of the first identified action if the first identified action was performed successfully.

12. The method of claim 6, wherein writing the derived data to the second data access object causes a second salon occurrence to be identified, wherein the second data access object is the same data object as the first data access object.

13. A machine-readable storage medium as memory with instructions which when processed, result in a machine:

identifying a first action occurrence in a first data access object, the first action occurrence causing a modification to a validity indicator of at least one data item of the first data access object, the first data access object having exclusive access to the at least one data item in storage;

calling, by the first dam access object, a proxy object valuate method by sending a message to the proxy object, wherein the message includes a representation of the first identified action and data affected by the first identified action;

executing the proxy object valuate method to derive data; and writing the derived data to a second data access object, the second data access object having exclusive access to the derived data in storage.

14. The machine-readable medium as a memory of claim 13, wherein executing the valuate method to drive data includes deriving the data as a function of the data and representation of the first identified action included in the message to the proxy object.

15. The machine-readable medium of claim 13, wherein identifying the first action occurrence in the first data access object includes the first data access object:

receiving an action method call of the first identified action performing the first identified action method; and sending the message to the proxy object representative of the first identified action if the first identified action was performed successfully.

16. The machine-readable medium of claim 13, wherein writing the derived data to the second data access object includes the proxy object calling a write method of the second data access object.

* * * * *